May 16, 1961 W. R. SEIGLE 2,984,821
LOGICAL BINARY COMPARISON CIRCUIT
Filed June 6, 1958
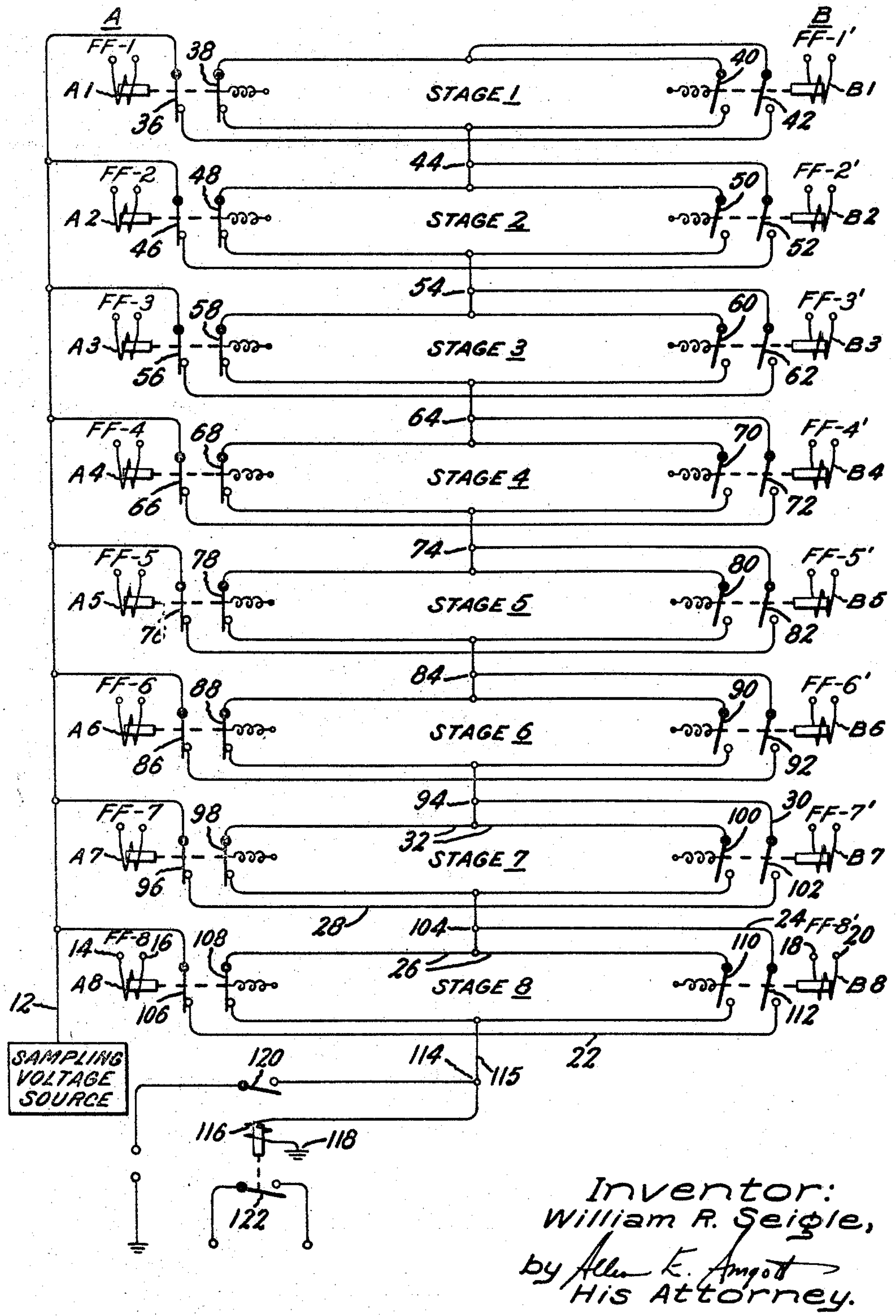
Inventor:
William R. Seigle,
by Allen E. Amgott
His Attorney.

United States Patent Office 2,984,821
Patented May 16, 1961

2,984,821

LOGICAL BINARY COMPARISON CIRCUIT

William R. Seigle, New Hartford, N.Y., assignor to General Electric Company, a corporation of New York Filed June 6, 1958, Ser. No. 740,349
8 Claims. (Cl. 340—149)

This invention relates broadly to computer circuitry, and more particularly to an ingenious comparison circuit which employs a chain of switching elements to compare two binary numbers and determine the larger of the two.

At the present time, relatively simple circuitry for comparing analog voltages which represent numerical quantities is available. However, the comparison of data in digital form ordinarily involves much more complex circuitry. For instance, this comparison is sometimes accomplished in a serial manner in which two binary numbers are compared bit by bit in a vacuum tube circuit. Such circuits start with corresponding lower order digits and include apparatus for remembering differences in the digits of highest order last detected. In addition, large diode matrices are sometimes used to recognize and compare various combinations of digits in a parallel mode in order to ascertain the larger of two binary numbers.

The advantages of an improved circuit which is able to perform a comparison of two binary numbers substantially instantaneously by comparing each of the corresponding digits of the two numbers substantially concurrently in order to determine the larger of the two will be obvious to those skilled in the art of electronic computers. According to the present invention this comparison is rapidly accomplished with inexpensive switching or relay elements and a minimum of circuitry.

In accordance with the invention, more particularly, a circuit which includes a plurality of substantially identical switching stages each including a double-pole, single-throw normally closed switch or relay is provided. Each switch or relay represents one of the digits of the standard or reference binary number, and a double-pole, single-throw normally open switch is used to electrically designate a corresponding digit of the number to be compared with the reference.

The normal position of each of the above-mentioned switches represents a binary zero while the actuated position represents the binary one, although it should be understood that this designation may be exactly reversed. In each stage of the comparison circuit a source of outside voltage is coupled to the serial connection of one contact of a first switch and one contact of a second switch, and thence through a parallel combination of the remaining contacts to the succeeding stage. Each succeeding stage represents a higher order or more significant digit. The connection point in the higher order stage is at the junction of the serialed and paralled contacts in that particular stage. By this means each stage provides an "and" function followed by an "or" function to pass on currents to the succeeding stage or output. Each stage also provides an "or" function to merely pass on current derived from the immediately preceding stage.

For each given digital position a stage recognizes by means of the "and" function followed by the "or" function whether the digit represented by the normally open contacts is "one" and the digit represented by the normally closed contacts is "zero." When this is true, the questioned number in this digital position is larger than the reference number and current is passed to the next higher order stage. Alternatively, current may be passed through a stage derived from the next lower order stage, merely by means of the "or" contacts. This indicates that the digits of the stage under consideration are at least equal to each other and that in a lower digital position the digit being queried was larger than the reference number. The ultimate output of the last or highest order stage concludes in a relay which will be operated if the number being queried is larger than the reference in the highest order digit. This relay is also operated if in any previous stage the number being queried is larger than the reference provided that the digit being queried is not less than the reference in any intermediate stage between the two.

Accordingly, therefore, a primary object of this invention is to provide an ingenious logical comparison circuit for binary numbers which exploits switching elements for a digit-by-digit comparison.

Another object of this invention is to simultaneously compare two binary numbers comprised of digits which are represented by the position of a plurality of switching elements.

A further object of this invention is to provide a simple and efficient comparison circuit for simultaneously comparing all the digits of two binary numbers.

These and other objects and advantages of the present invention will become apparent by referring to the accompanying detailed description and drawing in which like numerals indicate like parts and in which there is shown schematically the circuitry and interconnections employed in practicing the invention.

In the drawing, a series of relay coils, A1 through A8, is employed to read the digits of a reference binary number from the lowest order digit to the highest order digit into the apparatus. When coil A8 is left unenergized the highest order digit of an eight digit binary number represents zero. However, when a source of voltage is placed across terminals 14 and 16 to energize coil A8 and actuate the contacts 106 and 108 to open position, the highest order digit of the eight digit reference binary number represents a binary one. If all the other numbers of the binary reference number were zero, the reference number would, of course, equal two to the seventh power or one hundred twenty-eight.

The coils B1 through B8 in Figure 1 similarly represent, from the lowest order digit to the higest order digit, the binary number to be compared with the reference value read into the A coils. For example, when coil B8 is unenergized with the normally open contacts 110 and 112 unclosed, the coil B8 would represent the binary zero in the eighth and highest order digital position of this binary number. When a voltage is applied across terminals 18 and 20 of coil B8, relay contacts 110 and 112 will close to designate a binary one in the eighth and highest order digital positional of the number to be compared.

In the lefthand portion of the drawing, a voltage pulse input bus 12 couples a source of input sampling voltage to the normally closed contacts: 36, 46, 56, 66, 76, 86, 96, and 106 associated with coils A1 through A8, respectively.

The specific circuitry and interconnections for stages seven and eight of the present invention correspond to the two highest order digital positions of the reference number and the number to be compared as above explained. The circuitry and operation of these stages will be described below in detail, with the understanding that succeeding lower order stages differ only where specifically designated. The voltage input bus 12 couples electrical energy from a source of voltage pulses through the serial connection of normally closed contacts 106 operable by relay coil A8 and normally open contacts 112 operable by relay coil B8 to point 104. Point 104 is joined by conductors 26 to the parallel combination of normally closed contacts 108 and normally open contacts 110 to conductor 115. Conductor 115 is connected to one side of relay coil 116, the other side of which is grounded at ground point 118. Relay coil 116 has normally open indicating contacts 122 which may be employed in an outside circuit to indicate when coil 116 is energized. Coil 116 is also equipped with a set of holding contacts 120 which provide voltage from an outside source to maintain relay coil 116 in an energized position once coil 116 has been energized by the circuitry of the present invention.

Voltage pulse bus 12 is also coupled serially through normally closed contacts 96 operable by relay coil A7 and normally open relay contacts 102 operable by relay coil B7, to point 94. Point 94 is joined by means of conductors 32 which connect to the parallel combination of normally closed contacts 98 and normally open contacts 100 to the point 104 immediately below. The mode of connection for the remainder of the stages of the present invention is substantially identical, proceeding in this manner to the lowest order stage designated in the drawing as stage one.

In operation, when it is desired to compare a binary number B with a standard or reference binary number A, such binary numbers are set up upon relay coils B1 through B8 and A1 through A8, respectively. Where the binary digit one occurs in a certain digital position of the binary number, the corresponding relay coil is energized. Conversely, where the binary zero occurs in a given digital position the corresponding relay coil is left de-energized. In the drawing it will be recalled that all relays are in the de-energized or zero position. In each case a contact which is shown as being closed would be opened, and if shown as being open would be closed to designate a binary one at the given coil. For example, if coil A8 were energized to designate a binary one, and coil A7 were left de-energized to indicate a binary zero, coil B8 might remain de-energized to also indicate a binary zero. In like manner coil B7 as energized represents a binary one. Under these conditions, contacts 106 and 108 are open, contacts 100 and 102 are in closed position and the remaining contacts remain as shown. The following operation of this portion of the circuit now results. Voltage in sampling bus 12 is applied successively through contacts 96, 102, and 100 or 98 to point 104 which provides an output for stage seven. This indicates that insofar as stage seven is concerned, the B number being compared is larger than the A number, the reference. However, the voltage at point 104 is not coupled through stage eight because of the open contacts 108 and 110. Stage eight will also fail to couple voltage from bus 12 to the output of stage eight because of open contact 106.

Assume, however, for a moment that the eighth and highest order digit of the A number is zero as designated by the de-energized or normal position of coil A8. Voltage will then be conducted from point 104 through contact 108 to conductor 114 and actuate relay coil 116 to provide an indication. It will thus be seen that an indication represented by the operation of relay coil 116 takes place when the highest order digit of the B number exceeds the highest order digit of the A number.

Operation of coil 116 will also take place when the two are equal or when B is not less than A as well as whenever the B digit in stage seven is larger than the A digit in stage seven and so on. If the B digit in stage seven is smaller than the A digit in stage seven, no indication can take place. It will now be appreciated that if an output indicating that the B number is larger than the A number is to be obtained, some digit in the reference number which is a zero must have a one in the corresponding digital position in the number to be compared.

Moreover, if a one in the reference number is compared to a zero in the corresponding digital position in the number being sampled, then a higher order digit which is zero in the reference number must be a one in the corresponding spot of the number which is sampled for operation of coil 116.

To take an example which exploits all the stages of the present apparatus, assume that the reference or A number is 00110011, starting from the highest order or digit represented by A8 coil. Assume that the B number is 00110101, starting with the highest order digit represented by the B coil. The B number of course equals the decimal number 53 and is larger than the A or reference number which equals the decimal number 51. An output should thus be secured from the present apparatus for the purpose of operating relay coil 116. It is seen that a voltage pulse appearing on bus 12 for sampling the circuit will be able to traverse only the relay contacts 56, 66, 96, and 106. Any current flow from contacts 96 will be stopped by normally open contacts 102, and normally open contacts 112 will stop any current flow via relay contacts 106. Relay contacts 36, 46, 76, and 86 will be open due to the energization of coils A1, A2, A5 and A6, each of which represents a binary one in the present example. Current flow from relay contacts 66 will be prevented because of the open contacts 72. However, current which passes contact 56 will also traverse contact 62 operated by coil B3, as representative of the only digital position in the present example where the B number exceeds the A number.

Additionally, current passed by the serial combinations in contacts 56 and 62 will reach point 54 where it is allowed to pass by either one or both of contacts 58 and 60 to point 64. Energy from point 64 traverses relay contacts 68 to point 74 even though contact 70 is open to designate a binary zero in coil B4. Current from point 74 will pass contacts 80 operated by relay coil B5 representing a binary one. Current will then be conveyed, via point 84, through contacts 90 to point 94 and from point 94 through contacts 98 to point 104. Current from point 104 will pass through contacts 108 to point 114 and relay coil 116 thus operating contacts 122 to indicate the fact that the B number in the present example was larger than the A number.

It will now be evident that the present invention performs a comparison by having contacts which are placed in an "and" relation for coupling a source for power to contacts placed in an "or" relation and thence to the output of each digital stage. Since each of said pairs of contacts includes a normally closed contact representative of the reference number and a normally open contact representative of the number being compared, it will be appreciated that whenever the number being compared in a particular stage is greater than the reference number digit, an output will be produced from that stage. If the numbers are equal but the B number is not less than the A number, the "and" function will fail to operate but the "or" function will operate. By means of an additional input lead provided to the "or" function from the output of the previous stage it is thus possible to determine whether in the previous stage or some more remote stage the B digit was larger than the A digit, without the occurrence of an intermediate or "cutoff" stage in which B is less than A. When this condition occurs, a circuit to the aforementioned "or" function which provides an output indicative of the fact that the B number as a whole is larger than the A number is completed. If the A number and B number are equal, none of the previous stages explored in the series of "or" function circuits will be connected to a power source, and no output will be produced because of the equality between A and B.

The comparison is made according to the present invention with a small number of contacts per stage, and is caused to occur extremely rapidly. The sampling voltage on bus 12 need be of only short duration because of the ability of the holding circuit which employs contact 120 to lock relay coil 116 in an energized position whenever the B number is greater than the A number.

It will be appreciated that when it is desired to ascertain whether a number is smaller than another number, rather than larger this may be readily accomplished by interchanging the roles of the A and B coils.

It will be apparent to those skilled in the art that many modifications of the disclosed embodiment of this invention may be made without departing from the spirit and scope of the appended claims.

What is claimed is:

1. A device for comparing a pair of binary numbers to determine the greater of the two which includes a source of current; a plurality of stages for comparing digits of corresponding order in the numbers being compared, each of said stages including first means for passing current through the stage from the stage of lower order preceding when said digits being compared are equal or when a first of said digits is greater than a second of said digits being compared, second means for passing current to said first means when said first of said digits is greater than said second of said digits; said first means comprising a pair of paralleled switching contacts controlled respectively by the presence of said first digit and the absence of said second; said second means comprising a pair of serial contacts controlled respectively by the presence of said first digit and the absence of said second; and indicating means supplied current by said first means of the stage comparing the highest order digits of the numbers being compared.

2. A device for comparing binary numbers which includes a plurality of stages each for comparing digits of corresponding order in the numbers being compared; each of said stages comprising a pair of serially connected circuit means for passing current, one responsive to a digit of one number and the other responsive to the absence of a corresponding digit in the other number; a pair of parallel connected circuit means for passing current, one responsive to said digit of said one number and the other responsive to the absence of said corresponding digit, said parallel connected circuit connected to receive current from said serially connected circuit or from a lower order stage and to pass current to a next higher order stage.

3. A device for comparing binary numbers which includes a plurality of digit-by-digit comparison stages comprising an output point and paralleled contact means for transmitting power to said output point from the output point on the next preceding lower order stage, said paralleled contact means including a first normally open contact operative in response to a digit of a first of said numbers and a first normally closed contact operative in response to a corresponding digit of a second of said numbers, and serial contact means transmitting power from a source to said paralleled contact means, said serial contact means including a second normally open contact operative in response to said digit of said first of said numbers and a second normally closed contact operative in response to said corresponding digit of a second of said numbers.

4. A circuit for instantaneously comparing a first binary number with a second binary number to determine whether the value of the first exceeds the second which comprises a plurality of stages connected for digit-by-digit comparison; each of such stages having an input for coupling to a source of power, an output, first and second normally open contacts operative in response to a digit of said first number, and first and second normally closed contacts operative in response to a corresponding digit of said second number; each of such stages further including in order between said input and output the serial combination of said first normally open contact, said first normally closed contact, as well as the parallel combination of said second normally open contact and said second normally closed contact; and circuit means connecting the juncture between said parallel combination and said first normally closed contact to the output of the stage for comparing digits of the next lower order.

5. A device for comparing binary numbers to determine the greater of the two which includes a plurality of stages for digit-by-digit comparison, each such stage comprising a first input terminal for connecting to a source of electric power, an output terminal, and a second input terminal connected to the output terminal on the next preceding lower order stage, at least two first normally open contacts operative in response to a first digit, at least two second normally closed contacts operative in response to a second digit, a first circuit comprising one of said first contacts and one of said second contacts in series between said first and second input terminals, and a second circuit comprising another of said first and another of said second contacts in parallel between said second input terminal and said output terminal.

6. A device for comparing binary numbers which includes a plurality of comparison stages each for comparing corresponding digits of the numbers being compared, each of such stages comprising: an output terminal; a first double-pole, single-throw switch representative in a closed position of a binary zero and in an open position of a binary one and having first and second contacts; a second double-pole, single-throw switch representative in an open position of a binary zero and in a closed position of a binary one and having first and second contacts; means connecting said first contacts of said first and second double-pole, single-throw switches in a parallel combination; means connecting serially in order said second contacts of said first and second double-pole, single-throw switches, said parallel combination including said first contacts of each of said first and second double-pole, single-throw switches and said output terminal; and means serially connecting said output terminal, the parallel combination of the next higher order stage, and the output terminal of the next higher order stage.

7. A device for comparing binary numbers which comprise a plurality of stages each for comparing corresponding digits of the numbers being compared, each of such stages including an output terminal, a first relay having first and second normally closed contacts, a second relay having first and second normally open contacts, means connecting the first contacts of each of said first and second relays in a parallel combination; means serially connecting in order the second contacts of each of said first and second relays, said parallel combination including said first contacts of each of said first and second relays and said output terminal; and means serially connecting said output terminal, the parallel combination of the next higher order stage, and the output terminal of the next higher order stage.

8. A device for comparing a first and second binary number to determine the greater which includes at least two stages each of which is capable of comparing corresponding digits of the highest order and the next highest order respectively, comprising; a highest order stage including a first relay representative when energized of a binary one in the highest order position of said first number and representative when de-energized of a binary zero in the highest order position of said first number, said first relay having normally closed first contacts and normally closed second contacts, said highest order stage further including a second relay representative when energized of a binary one in the highest order position of said second number and representative when de-energized of a binary zero in the highest order position of said second number, said second relay having normally open third contacts and normally open fourth contacts; a next highest order stage including a third relay representative when energized of a binary one in the next highest order position of said first number and representative when de-energized of a binary zero in the next highest order position of said first number, said third relay having normally closed fifth contacts and normally closed sixth contacts, said next highest order stage also including a fourth relay representative when energized of a binary one in the next highest order position of said second number and representative when de-energized of a binary zero in the next highest order position of said second number, said fourth relay having normally open seventh contacts and normally open eighth contacts; a supply voltage bus; an output indicating coil; circuit means connecting said first and third contacts in a first parallel combination; circuit means connecting said fifth and seventh contacts in a second parallel combination; circuit means serially connecting in order said bus, said fourth contacts, said second contacts, said first parallel combination, and said output indicating coil; and circuit means serially connecting in order said bus, said eighth contacts, said sixth contacts, and said second parallel combination to the juncture between said second contacts and said first parallel combination; whereby said output indicating coil is energized only when the two higher order digits of said second number exceed as a number the two higher order digits of said first number.

References Cited in the file of this patent

UNITED STATES PATENTS

| | | |
|---|---|---|
| 2,276,747 | Steffes | Mar. 17, 1942 |
| 2,700,756 | Estrems | Jan. 25, 1955 |
| 2,801,405 | Oliwa | July 30, 1957 |
| 2,844,309 | Ayres | July 22, 1958 |